Figure 1:
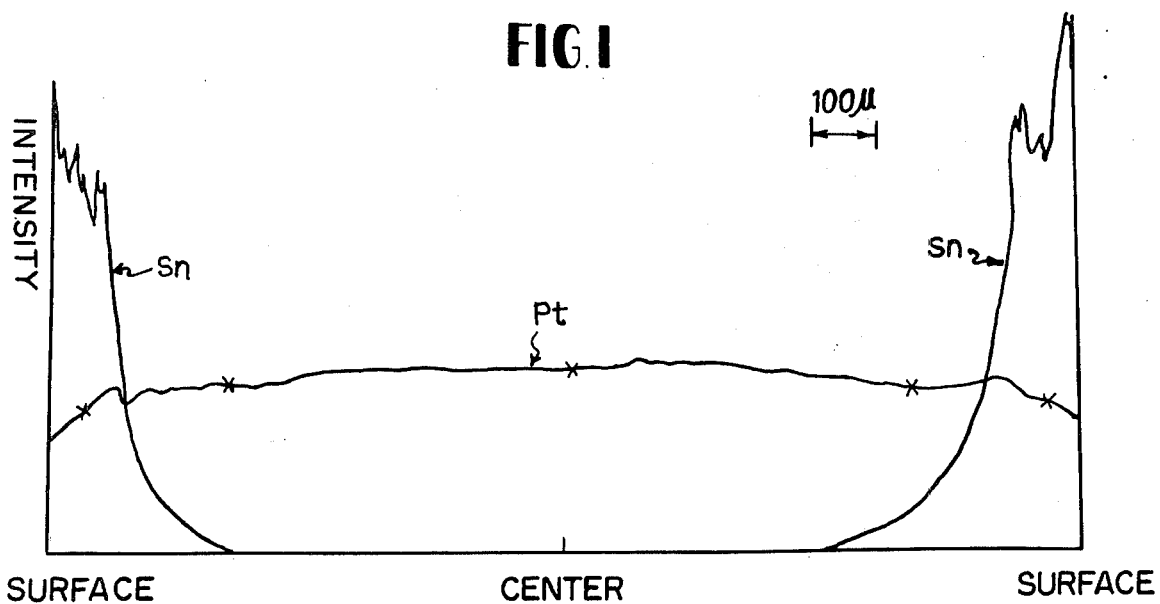

United States Patent [19]

Nishikawa et al.

[11] 4,020,011

[45] Apr. 26, 1977

[54] METHOD FOR PREPARING HYDROCARBON CONVERSION CATALYST

[75] Inventors: Eiichiroh Nishikawa, Saitama; Takuji Itoh, Sayama; Tadashi Miura, Saitama, all of Japan

[73] Assignee: Toa Nenryo Kogyo Kabushiki Kaisha, Tokyo, Japan

[22] Filed: Apr. 10, 1975

[21] Appl. No.: 566,979

[30] Foreign Application Priority Data

Apr. 19, 1974 Japan .............................. 49-44194

[52] U.S. Cl. ........................ 252/441; 252/429 R; 252/442
[51] Int. Cl.² ...................................... B01J 27/06
[58] Field of Search ............... 252/441, 442, 429 R

[56] References Cited

UNITED STATES PATENTS

| | | | |
|---|---|---|---|
| 3,740,328 | 6/1973 | Rausch | 252/441 |
| 3,745,112 | 7/1973 | Rausch | 208/139 |
| 3,759,841 | 9/1973 | Wilhelm | 252/466 P X |
| 3,764,557 | 10/1973 | Kluksdahl | 208/138 |
| 3,868,317 | 2/1975 | Itoh et al. | 208/139 |
| 3,883,419 | 5/1975 | Itoh et al. | 252/441 |
| 3,898,154 | 8/1975 | Rausch | 252/441 |

*Primary Examiner*—Patrick P. Garvin
*Assistant Examiner*—John P. Sheehan
*Attorney, Agent, or Firm*—Reuben Miller

[57] ABSTRACT

Improved distribution of the tin component of a hydrocarbon conversion catalyst also containing a Group VIII noble metal and halogen on a refractory carrier is obtained by impregnation of the carrier with a solution comprising an organic solvent containing a hydrogen halide and a soluble compound of tin.

21 Claims, 2 Drawing Figures

METHOD FOR PREPARING HYDROCARBON CONVERSION CATALYST

This invention relates to a method for preparing a hydrocarbon conversion catalyst, particularly a catalyst useful in various petroleum refining and petrochemical processes such as, for example, hydrodesulfurization, hydrodenitrification, alkylation, aromatization, isomerization, dehydrogenation, reforming, hydrocracking, etc. In more detail, the present invention pertains to a method for preparing a bimetallic hydrocarbon conversion catalyst useful in heterogeneous catalysis and comprising two kinds of active metallic components on a refractory carrier.

Catalytic conversion in the presence of a solid catalyst is widely employed in petroleum refining, petrochemical and other chemical processes. A solid catalyst plays such as important role in heterogeneous catalysis that a great deal of effort has been paid for the improvement and development thereof. Recently, it has become desirable both socially and technically to develop an effective catalyst so as to satisfy the recent demand for the production of a large amount of low-cost catalyst suitable for the production of pollution-free fuels.

In the present description, catalytic reforming, or reforming, of hydrocarbons is defined as the reactions involving dehydrogenation of naphthenes, dehydrocyclization and isomerization of paraffins, hydrocracking of naphthenes and paraffins, etc., or the mixture thereof. The reforming of hydrocarbons is generally employed for the purpose of supplying a high-octane-number blending stock to fuel oils of internal combustion engine, an aromatic solvent, and other aromatic-rich chemical products by the reactions described above.

In order to obtain the desired reaction product in good yield and desired stability by a hydrocarbon conversion process, such as reforming, etc., it is required that the catalyst should have not only high activity and good selectivity but also excellent catalyst life so as to be durable for long-time and continuous usage. Ordinarily, in the reforming of hydrocarbons, it is required that a $C_5+$ hydrocarbon product having a constant octane number must be obtained at lower temperatures with good yield while maintaining the constant conversion of a feed stock hydrocarbon fraction to the product having a constant octane number. It is also an essential character required for a conversion catalyst to maintain a high-level yield of $C_5+$ hydrocarbon fractions while repressing the production of cracked gas keeping constant conversion for a long-time period. Generally, the platinum-on-alumina catalyst has been widely utilized in the catalytic reforming of hydrocarbons contributing to the production of internal combustion engine fuels and a variety of aromatic hydrocarbon oils. From the economical point of view, the amount of expensive platinum-containing catalyst utilized in the process must be decreased to a minimum. Another problem that must be considered as to the industrial platinum catalyst is the gradual loss of activity due to agglomerization of the platinum metal particles.

Several methods of overcoming these difficulties such as, for example, a method for maintaining good dispersion of platinum particles in the catalyst by adding a suitable amount of a halogen compound to a feed stock oil during operation, or a method of redispersion of platinum particles by treating the deactivated catalyst with a halogen compound, etc., have been disclosed in the art.

On the other hand, it has been discovered that a platinum-tin bimetallic catalyst supported on a refractory oxide support wherein the tin component is uniformly distributed throughout the support shows excellent activity, stability and selectivity. While the reason why such platinum-tin catalysts show such excellent catalyst properties is not precisely known, it is believed that an interaction between the platinum and tin contributes to these desired results. In attempting to prepare such catalysts, it was found that the usual well-known methods of preparing bimetallic catalysts did not result in the uniform distribution of the tin component throughout the support or carrier. In the use of such known procedures, the platinum component was found to be distributed uniformly from the surface into the inner part throughout the carrier while the tin component was found to be concentrated on the surface of the carrier and not uniformly distributed throughout the carrier as was the case with the platinum component.

It is an object of our invention to provide an improved process for the preparation of a hydrocarbon conversion catalyst comprising a refractory carrier, a Group VIII noble metal component, a tin component and a halogen component. More particularly, the object of the present invention is to provide an improved process for the preparation of such a catalyst wherein the tin component is uniformly dispersed from the surface throughout the inner part of the catalyst.

These and other objects may be achieved by the present invention wherein the hereinbefore described hydrocarbon conversion catalyst comprising a refractory carrier, a Group VIII noble metal component, a tin component and a halogen component is prepared by a procedure wherein the tin component is introduced into said carrier by impregnating the carrier with a solution comprising an organic solvent containing a hydrogen halide and a soluble compound of tin.

In the present invention, a refractory carrier, especially a refractory inorganic oxide carrier, is used as a carrier. It contains, for example, one or more of alumina, bentonite, clay, diatomaceous earth, zeolite, silica, activated carbon, magnesia, zirconia, thoria, etc. The most preferred carrier is alumina, to which if desired a suitable amount of other refractory carrier materials such as silica, zirconia, magnesia, etc., may be added within the range of about 1 to 20 wt. % based on the total carrier. Further, carbon materials such as activated carbon can be used as a carrier in addition to the inorganic oxides.

The preferred alumina carrier has a surface area of more than 50m²/g, preferably between about 100 to 300 m²/g, a bulk density of about 0.3 to 1.0 g/ml, preferably between about 0.4–0.8 g/ml, an average pore volume of about 0.2 to 1.1 ml/g, and an average pore diameter of about 50 to 300A, preferably between about 80–150A. It is preferred that the pore size distribution in the carrier be such that pores having a diameter of at least 60A occupy at least about 60% of the total pore volume. Suitable alumina materials are the crystalline alumina known as the $\gamma$-, $\eta$-, or $\chi$-alumina, which can be prepared by adding acids or bases to a solution of soluble aluminum compounds such as aluminum chloride, aluminum sulfate, sodium aluminate, aluminum alkoxide, etc., to produce a hydrated alumina followed by drying and calcination thereof. Silica, or other carrier materials may be added to the alumina by the coprecipitation when forming the hydrated alumina or by mixing the precipitates thereof.

The metallic component of the Group VIII metals of the Periodic Table includes one or more platinum group metal components such as ruthenium, rhodium, palladium, osmium, iridium, platinum, etc. However, platinum is the preferred component. The Group VIII metal component is supported on the carrier within the range of from about 0.01 to 3 wt. %, preferably from about 0.05 to 1 wt. %. It is preferably to prepare the catalyst by the impregnation method by contacting the carrier with a solution of a soluble compound of one or more of the noble metals although it may be possible to prepare the catalyst by the coprecipitation or precipitation method. Any soluble compound may be used, but a soluble compound which can be easily subjected to thermal decomposition and reduction is preferred; for example, inorganic salts such as halide, nitrate, halogenoacids, halogeno-salts, inorganic complex compounds, or organic salts such as the complex salt of acetylacetone, amine salt, etc. Where the Group VIII noble metal is platinum, platinum chloride, platinum nitrate, chloroplatinic acid, ammonium chloroplatinate, potassium chloroplatinate, platinum polyamine, platinum acetylacetonate, etc., are preferably used.

The impregnation solution of the noble metal compound is prepared by dissolving the compounds mentioned above into water or any other inorganic or organic solvent. The concentration of the metallic component ranges from about 0.01 to 2 wt. %, preferably from about 0.05 to 1 wt. %. The pH of the impregnation solution should be controlled to less than about 4, preferably less than 3, by adding a suitable acid to it. By controlling the pH within the above range, the active component can be effectively dispersed into the inner part of the catalyst. Generally, it is preferred to use a halogenoacid aqueous solution of the noble metals.

The following description concerns the method of combining the essential tin component of the catalyst of the present invention into the carrier. The impregnation of a solution of a soluble compound of tin into a carrier may be carried out simultaneously with, prior to, or following the impregnation of the noble metal component into the carrier. The soluble compounds of tin which may be used, will include but not be limited to stannous or stannic halide, nitrate, sulfate, acetate, amine complex, di-or tetra-alkyl compounds like di-or tetra-ethyl, propyl butyl, or octyl-tin, di-or tetra-alkoxy compound like di-, or tetra-ethoxy tin, etc. However, the halide is the best when considering its remarkable effect on speed of reaction, ease of operation, economy, availability, etc.

The impregnation solution of the tin component is prepared by dissolving the soluble compound as mentioned above in an organic solvent containing a hydrogen halide. The present invention resides in the discovery that as to the impregnation of the tin component the organic solvent used plays a remarkably important role. In our invention, the desired objective is attained by using an organic solvent containing a hydrogen halide as a solvent.

A preferred solvent for impregnation is a mixture of a hydrohalogenic acid (an aqueous solution of a hydrogen halide) and an organic solvent.

As the hydrogen halide, there may be employed hydrogen fluoride, hydrogen bromide, hydrogen chloride and mixtures of two or more of these halides. Use of hydrogen chloride is especially preferred. These hydrogen halides can be used in the form of an aqueous solution. The concentration of the hydrogen halide in the impregnation solution is not particularly critical and it can optionally be determined, but it is generally preferred that the concentration be within a range of from about 0.01 to about 2 mole %. Further, it is preferred that the amount of water in the impregnation solution be less than about 50% by volume.

As the organic solvent, there can be employed alcohols, ketones, ethers, amines, acetamides, sulfoxides, sulforanes and other "basic solvents". More specifically, there are preferably employed aliphatic alcohols such as methanol and ethanol, ketones such as acetone, methylethylketone, diethylketone and cyclohexanone, ethers such as ethyl ether, methyl ether and propyl ether, alkyl amines such as methylamine and dimethylamine, dialkylformamides such as dimethylformamide, and acetylacetamide and dialkylsulfoxide. Mixtures of two or more of these organic solvents can also be used.

As described above, the impregnation solution is prepared by dissolving a soluble compound of tin in an organic solvent, and the tin concentration is determined appropriately depending on other operating conditions but it is generally preferred that the tin concentration be within a range of from about 0.01 to about 2% by weight, preferably from about 0.05 to about 1% by weight.

The impregnation of the noble metal component and tin component into a carrier is carried out by impregnating the carrier with the solution of the respective metal compounds. The amount of impregnation solution should be sufficient to completely immerse the carrier, usually within the range from about 1 to 20 times of the carrier by volume, depending on the metal concentration in the impregnation solution. The impregnation treatment may be carried out under a wide range of conditions including ambient or elevated temperatures and atmospheric or superatmospheric pressures. Then noble metal or tin component can be dispersed on the carrier by such impregnation methods as the simultaneous impregnation of both components using the same impregnation solution, or if desired, the impregnation of the tin component following the dispersion of the noble metal component within the carrier or, alternatively, the tin component can be initially deposited throughout the carrier, followed by the deposition of the noble metal component.

In one preferred embodiment of the present invention:
1. a carrier is impregnated with an aqueous halogenoacid solution of noble metal compound followed by washing, drying and/or calcination, and
2. the impregnated noble metal carrier is impregnated with a solution of a dissolved tin compound in a mixture of an aqueous hydrogen halide and an organic solvent, followed by washing, drying and/or calcination, whereby the tin component can be dispersed uniformly to the inner part of the catalyst.

In another preferred embodiment of the present invention a soluble compound of a noble metal and a soluble compound of tin are dissolved in a solvent composed of a hydrogen halide and an organic solvent, and a carrier which has been calcined in advance is immersed in the so prepared solution to thereby deposit both the noble metal component and the tin component simultaneously. The carrier impregnated with the noble component and the tn component is then washed, and dried and/or calcined.

The effects of the process of this invention are manifested most conspicuously when the simultaneous impregnation method of the second embodiment is adopted. When both the components are impregnated simultaneously by using an aqueous solution of hydrochloric acid according to a customary technique, the noble metal compartment is deposited relatively uniformly but it is difficult to distribute the tin component uniformly and when the hydrochloric acid concentration is not elevated, there is brought about a disadvantage that a precipitate (considered to be composed of tin oxychloride) is formed during the impregnation step. Further, when the hydrochloric acid concentration is elevated so as to prevent formation of such precipitate, the quantity of the noble metal and tin components left in the solution increase and it is impossible to deposit the intended components quantitatively with ease. In the case of the simultaneous impregnation using solely an organic solvent as is generally known in the art, such as methanol, ethanol and acetone, it is difficult to distribute uniformly even the noble metal component as well as the tin component.

In contrast, according to the process of this invention, it is possible to deposit and disperse both the noble metal and tin components simutaneously and uniformly. Accordingly, in this invention the preparation steps can be greatly simplified as compared with conventional methods and economical advantages can be attained. Furthermore, according to this invention, catalysts having excellent catalytic characteristics can be prepared easily.

It is also required to promote the catalyst performance in the hydrocarbon conversion by adding a halogen component. Fluorine or chloride is preferred as a halogen component, but bromine can be used, too. The halogen is contained within the range of 0.1 to 5 wt. % in the catalyst, preferably within the range of about 0.4 to 3 wt. %. When using chlorine as a halogen component it is contained within the range of about 0.2 to 2 wt. %, preferably within the range of about 0.5 to 1.5 wt. %. The introduction of halogen into catalyst can be carried out by any method and at any time of the catalyst preparation, for example, prior to, following or simultaneously with the impregnation of the noble metal or tin component. In the usual operation, the halogen component is introduced simultaneously with the incorporation of the noble metal or tin component. It can also be introduced by contacting a carrier material in a vapor phase or liquid phase with a halogen compound such as hydrogen fluoride, hydrogen chloride, ammonium chloride, etc.

The noble metal-tin catalyst prepared in accordance with the procedure of the present invention has extremely good selectivity and stability when used in hydrocarbon conversion processes because of the uniform distribution of the tin component from the surface to the inner part of the catalyst.

The catalyst of the present invention can contain an optional third metallic component if required such as a component selected from the Group I metals, Group II metals, Group IV metals except the essential tin component, Group VI metals, Group VII metals or Group VIII metals except the essential noble metal component. For example, copper, cadmium, zinc, germanium, lead, etc., are preferred. By adding the third component to the essential noble metal-tin components the catalyst performance can be promoted. Although it can be added by any usual method, it is preferably to add it by an impregnation method within the range of about 0.01 to about 2 wt. % based on the final catalyst.

The drying treatment in the manufacturing process of the present invention, catalyst is carried out by heating at a temperature above about 80° C, preferably between about 80° and 120° C in the presence of nitrogen or oxygen in an air stream, and the calcination treatment is carried out at a temperature between about 100° and 800° C and preferably between about 400° to 700° C in the presence of oxygen in an air stream. The washing is conducted using water or an organic solvent such as alcohol, ether, hydrocarbon, etc.

The catalyst of the present invention can be prepared in any shape, such as spheres, tablets, or extrudates and the preferred type is dependent on the kind of hydrocarbon conversion process.

The noble metal-tin catalyst of the present invention is utilized in such hydrocarbon conversion processes as reforming, hydrocracking, catalytic isomerization, catalytic alkylation, etc., and also in hydrofining, hydrotreating and hydrodesulfurization of hydrocarbons. The catalyst is most effective in the catalytic reforming process under the following conditions using hydrocarbon fractions ranging from a light naphtha fraction having a boiling point between about 40° to 120° C to a heavy naphtha fraction having a boiling point between about 100° and 170° C or a kerosene fraction having a boiling point between about 150° and 250° C.

| Feedstock Oil | Heavy Naphtha Fraction (Boiling Point: about 100–170° C) | Kerosene Fraction (Boiling Point: about 150–250° C) |
|---|---|---|
| Reaction Temperature, ° C | 500–600 | 400–600 |
| Reaction Pressure, kg/cm² | below 35 | below 50 |
| Liquid Hourly Space Velocity, W/H/W | 0.1–10 | 0.1–10 |
| Hydrogen/ Hydrocarbon, mole ratio | 0.2–20 | 0.2–20 |

It is apparent from the above reaction conditions that the reforming process using a catalyst of the present invention makes it possible to operate under extremely low pressures.

As is seen from the foregoing, this invention relates to a process for the preparation of catalysts for conversion of hydrocarbons which comprise a refractory carrier, a noble metal component of the Group VIII of the Periodic Table, a tin component and, if desired, a third metal component, characterized in that the tin component is supported on the carrier by using as an impregnation solvent an organic solvent containing a hydrogen halide.

The distribution state of the deposited metals in the catalyst prepared according to the process of this invention can be determined according to the EPMA analysis which will now be described by reference to FIGS. 1 and 2.

FIG. 1 illustrates the results of the EPMA analysis showing the distribution state of platinum and tin in a platinum-tin catalyst prepared according to the known method described as a comparison to the process of this invention. FIG. 2 illustrates the results of the EPMA analysis showing the distribution state of platinum and tin in the catalyst prepared according to this invention.

EXAMPLE 1

Catalysts were prepared by the following procedure.

Catalyst A (Comparison 1)

100 gr. of an alumina carrier having a specific surface area of 173 m$^2$/gr. was impregnated with 500 ml. of an aqueous solution of 0.1 N hydrochloric acid into which 0.80 gr. of chloroplatinic acid H$_2$PtCl$_6$·2H$_2$O was dissolved. The impregnated alumina was after 48 hours separated from any remaining liquid and then dried for 4 hours at 120° C. The product catalyst contained 0.3 wt. % of platinum.

Catalyst B (Comparison 2)

4.0 gr. of Catalyst A were impregnated with 25 ml. of a solution of methanol into which 0.0347 gr. of stannous chloride SnCl$_2$·2H$_2$O was dissolved. After 48 hours, the impregnated catalyst was subjected to suctioning off of methanol and then dried for 4 hours at 120° C.

Catalyst C (Comparison 3)

This catalyst was prepared in the same manner as in the case of the Catalyst B except that a 0.2N aqueous solution of hydrochloric acid (5 cc of 1N hydrochloric acid plus 20 cc of pure water) was used as the solvent for stannous chloride.

Catalyst D (Catalyst of This Invention)

This catalyst was prepared in the same manner as in the case of the Catalyst B except that a mixture of 4 parts by volume of methanol and 1 part by volume of 1N aqueous solution of hydrochloric acid was used as the solvent for stannous chloride.

Catalyst E (Catalyst of This Invention)

This catalyst was prepared in the same manner as in the case of the Catalyst D except that stannic chloride was used instead of stannous chloride as the tin compound.

Figure 2:
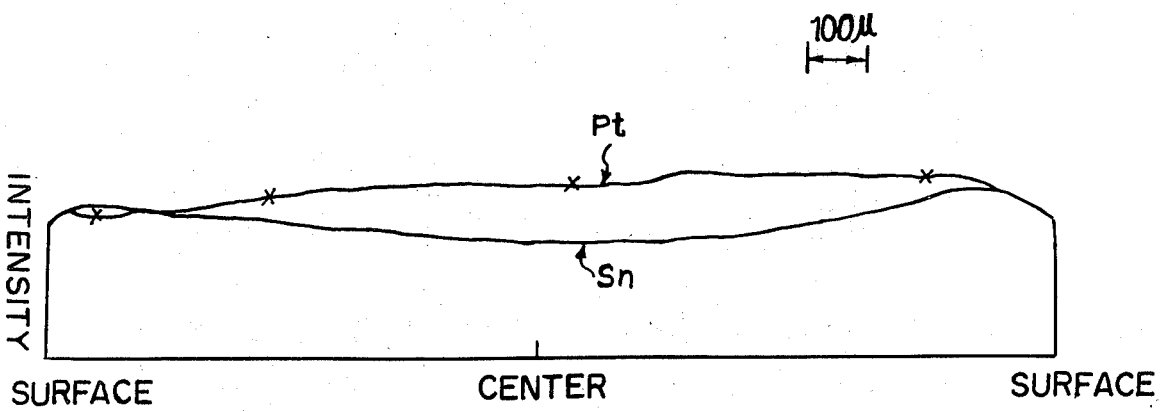

Results of the EPMA analysis made on the sections of the Catalysts C and D are shown in FIGS. 1 and 2, from which it will readily be understood that in both the catalysts platinum is distributed uniformly but there is a great difference between the two catalysts with respect to the distribution state of tin. More specifically, it will readily be understood that in case an aqueous solution of hydrochloric acid is used (Catalyst C), tin is present predominantly in the portion within 200 μ from the surface of the catalyst. This tendency was also observed in the Catalyst B prepared by using methanol alone. In contrast, it is seen that in the catalyst prepared by using a methanol-hydrochloric acid mixture solvent (Catalyst D and Catalyst E), tin as well as platinum is uniformly distributed.

To appraise the performance of the catalysts, a n-hexane feed was catalytically reformed under atmospheric pressure in the presence of Catalysts A to E. After filling the reactor vessel with the catalysts, the following pretreatments were carried out in the order as described below.

1. Calcination, at 500° C for 1 hour in the air stream with a velocity of 60 ml./min.
2. N$_2$ purge, with a N$_2$ flow rate of 150 ml./min. for 0.5 hours.
3. Hydrogen reduction, with a H$_2$ flow rate of 60 ml./min. at 500° C, for 1 hour.

On finishing the above pretreatment, the reforming was conducted under the following conditions.

| | |
|---|---|
| Pressure | atmospheric |
| Temperature | 500° C |
| Feedstock | n-hexane |
| Liquid Hourly Space Velocity | 1.0 W/H/W |
| Hydrogen/Feedstock | 12 mole ratio |

The results are illustrated in Table 1. In addition, the results of the EPMA analysis, i.e., r/R (in which R stands for the diameter of the catalyst and r stands for the diameter of the portion where tin is distributed) are also shown in Table 1.

As is apparent from the results shown in Table 1, in the catalyst prepared according to the process of this invention tin is distributed uniformly even up to the interior of the catalyst as compared with the case of the catalyst prepared according to the conventional method, and the catalyst prepared according to the process of this invention is highly improved over the conventional catalyst with respect to the deactivation rate and the yield of benzene.

TABLE 1

Results of Evaluation of n-Hexane Reforming Activity of Various Catalysts

| Catalyst | Deactivation Rate Constant (Rd*) (hr$^{-1}$) | Benzene Yield** (% by mole) | r/R |
|---|---|---|---|
| A | 9.8 | 3.1 | — |
| B | 4.7 | 6.9 | 0.117 |
| C | 2.67 | 10.6 | 0.226 |
| D | 0.80 | 24.0 | 1 |
| E | 0.37 | 31.3 | 1 |

$$*Rd = -\frac{1}{t}\left(\frac{1}{x_o} - \frac{1}{x_t}\right)$$

t: reaction time
$x_o$: initial yield of benzene
$x_t$: yield of benzene after the reaction time t
**the value obtained when 3 hours have passed from the start of the reaction

EXAMPLE 2

Catalysts used in Example 2 were prepared according to the following methods.

Catalyst F (Comparison 4)

0.159 g of chloroplatinic acid and 0.174 g of stannous chloride were dissolved in 100 ml of methanol, and 20 g of an alumina carrier which had been calcined at 500° C. for 1 hour in advance was immersed into the entire so formed solution. After 48 hours had passed, the solution was removed, and the impregnated carrier was dried at 120° C. for 4 hours.

Catalyst G (Comparison 5)

0.159 g of chloroplatinic acid and 0.174 g of stannous chloride were dissolved in 10 ml of concentrated hydrochloric acid to form a platinum-tin complex, and the solution was diluted with 90 ml of distilled water to form an impregnation solution. Then, 20 g of an alumina carrier which had previously been calcined at 500° C. for 1 hour was immersed in the so-formed impregnation solution. After 48 hours had passed, the solution was sucked and removed and the impregnated carrier was dried at 120° C. for 4 hours.

Catalyst H (Catalyst of This Invention)

0.155 g of chloroplatinic acid and 0.174 g of stannous chloride were dissolved in 100 ml of a hydrochloric acid-methanol mixture solvent (containing 2 ml of concentrated hydrochloric acid), and 20 g of an alumina carrier which had previously been calcined at 500° C. for 1 hour was immersed in the entire solution. After 48 hours had passed, the solution was removed, and the impregnated carrier was dried at 120° C. for 4 hours.

Reforming of n-hexane was conducted under the same conditions as in Example 1 by using these platinum-tin catalysts, respectively, to obtain results shown in Table 2, from which it is seen that Catalyst H prepared according to this invention has a lower deactivation rate and a much higher yield of benzene than Catalysts F and G prepared according to conventional methods.

TABLE 2

Comparison of n-Hexane Reforming Activity in Catalysts Prepared by Simultaneous Impregnation

| Catalyst | Deactivation Rate Constant (Rd*) (hr$^{-1}$) | Benzene Yield** (% by mole) |
| --- | --- | --- |
| F | 2.27 | 9.0 |
| G | 2.50 | 11.6 |
| H | 0.30 | 43.0 |

*, **same as in Table 1

What is claimed is:

1. In a method for preparing a hydrocarbon conversion catalyst comprising from about 0.01 to about 3 weight % of a Group VIII noble metal component, from about 0.1 to about 5 weight % of a halogen component and a tin component composited with a refractory carrier, the improvement which comprises compositing said tin component with said carrier by impregnating said carrier or the carrier which supports the said noble metal component and/or halogen component with a solution comprising an organic solvent containing a hydrogen halide and a soluble compound of tin.

2. The method of claim 1 wherein said Group VIII noble metal component is platinum.

3. The method of claim 1 wherein said halogen component is chlorine or fluorine.

4. The method of claim 1 wherein said solution comprises from about 0.01 to 2 weight % of said soluble compound of tin.

5. The method of claim 4 wherein said soluble compound of tin is stannous chloride.

6. The method of claim 4 wherein said soluble compound of tin is stannic chloride.

7. The method of claim 1 wherein said organic solvent is selected from the group consisting of alcohols, ketones, ethers, amines, acetamides, sulfoxides, sulforanes and mixtures thereof.

8. The method of claim 7 wherein said organic solvent is an aliphatic alcohol.

9. The method of claim 8 wherein said organic solvent is methanol.

10. The method of claim 1 wherein said carrier comprises alumina.

11. The method of claim 10 wherein said alumina has a pore size distribution such that pores having a diameter of at least 60A occupy at least about 60% of the total pore volume.

12. A method according to claim 1 wherein said hydrogen halide is hydrogen chloride.

13. A method for preparing a hydrocarbon conversion catalyst which comprises the following steps in combination:
   1. impregnating a refractory carrier with an aqueous halogen acid solution comprising from about 0.01 to 2 weight % of a Group VIII noble metal compound;
   2. washing and drying the impregnated carrier from step (1);
   3. impregnating the product of step (2) with a solution comprising an organic solvent containing a hydrogen halide and from about 0.01 to 2 weight % of a soluble compound of tin; and
   4. washing and drying the product of step (3).

14. The method of claim 13 wherein said aqueous halogen acid solution is a hydrochloric acid solution and said Group VIII noble metal is platinum.

15. The method of claim 13 wherein said tin compound is stannous chloride and said organic solvent is methanol.

16. The method of claim 13 wherein said soluble compound of tin is stannic chloride.

17. The method of claim 13 wherein said organic solvent is selected from the group consisting of alcohols, ketones, ethers, amines, acetamides, sulfoxides, sulforanes and mixtures thereof.

18. The method of claim 13 wherein said Group VIII noble metal is platinum, said organic solvent is methanol, said hydrogen halide is hydrogen chloride and said carrier comprises alumina.

19. A method for preparing a hydrocarbon conversion catalyst which comprises the following steps in combination:
   1. impregnating a refractory carrier with a solution comprising an organic solvent containing a hydrogen halide, from about 0.01 to 2 weight % of a soluble compound of a Group VIII noble metal and from about 0.01 to 2 to weight % of a soluble compound of tin; and
   2. washing and drying the impregnated carrier from step (1).

20. The method of claim 19 wherein said Group VIII noble metal is platinum, said soluble compound of tin is stannous chloride and said organic solvent is selected from the group consisting of alcohols, ketones, ethers, amines, acetamides, sulfoxides, sulforanes and mixtures thereof.

21. The method of claim 1 wherein said catalyst comprises a third metallic component selected from the group consisting of Group I metals, Group II metals, Group IV metals, Group VI metals, Group VII metals and Group VIII metals.